Nov. 27, 1951

C. M. KRAMER 2,576,608

FLIGHT INFORMATION DEVICE

Filed Feb. 28, 1949

Inventor

Cornelius M. Kramer

By Clarence A. O'Brien and Harvey B. Jacobson

Attorneys

Patented Nov. 27, 1951 2,576,608

UNITED STATES PATENT OFFICE 2,576,608

FLIGHT INFORMATION DEVICE

Cornelius M. Kramer, New Orleans, La.

Application February 28, 1949, Serial No. 78,793

1 Claim. (Cl. 235—61)

This invention relates to new and useful improvements in indicating devices and the primary object of the present invention is to provide an information bearing disk that will indicate to an airline pilot the necessary information pertaining to a schedule stop such as the call letters of the radio range station, elevation of the radio range station, distance between schedule stops and various other necessary information so that the pilot may approach an air field in a safe manner.

Another important object of the present invention is to provide an airway indicator including a plurality of indicia bearing disks which are extremely small and compact in structure to facilitate the same to be carried in the pocket of a pilot.

A further object of the present invention is to provide a device of the aforementioned character containing flight information necessary for the safe flying of an airplane and including a plurality of indicia bearing disks which are pivotally and removably secured to each other to permit the same to be assembled or disassembled in a convenient manner for the replacement of disks having information pertaining to a particular flight.

A still further aim of the present invention is to provide an airway indicator that is simple and practical in construction, strong and reliable in use, neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which;

Figures 1, 2, 3, 4:
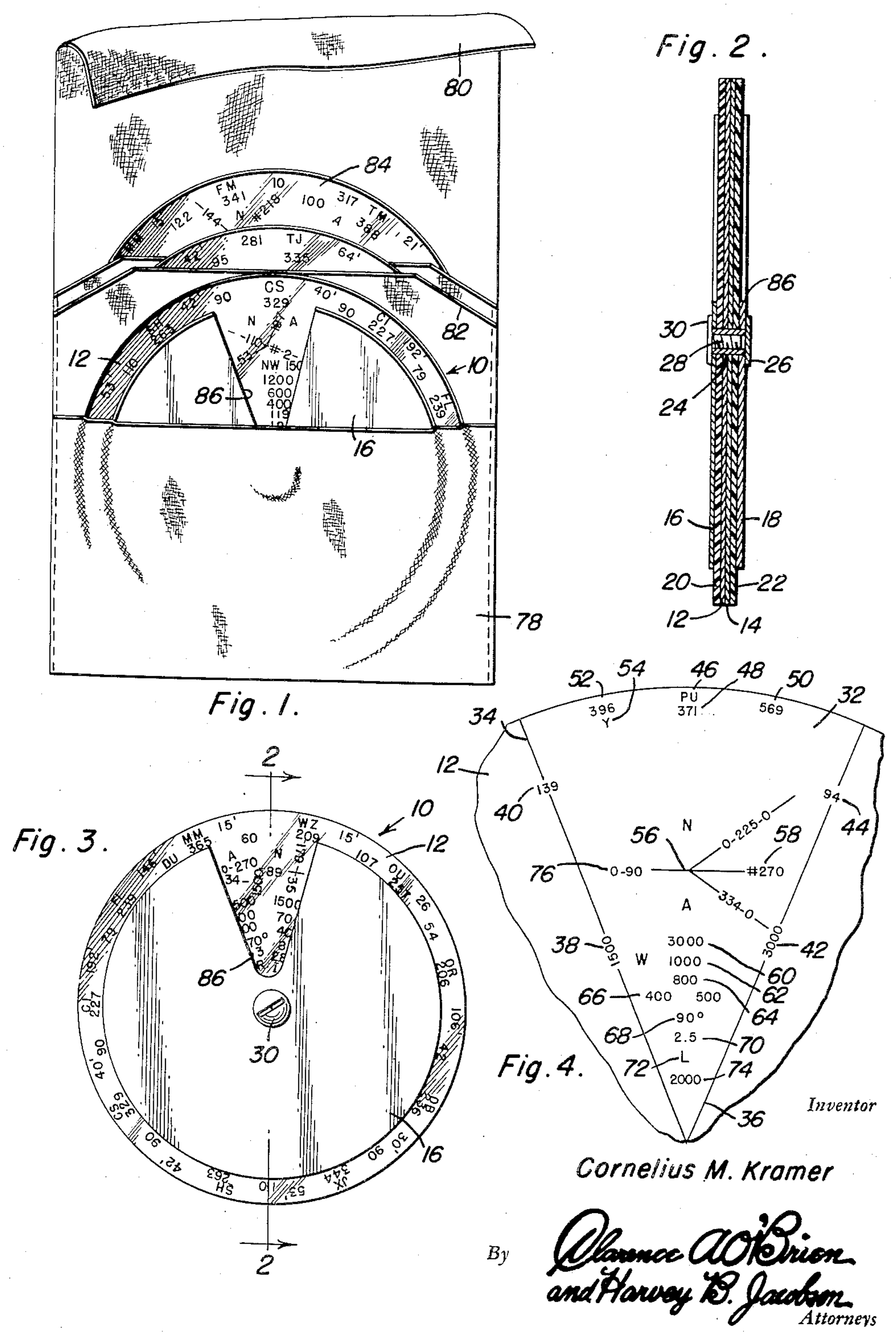
Figure 1 is a front elevational view showing the present invention applied to a case and with auxiliary indicia bearing disks retained in the case.
Figure 2 is a vertical sectional view taken substantially on the plane of section line 2—2 of Figure 3.
Figure 3 is a front elevational view of the present invention.
Figure 4 is a fragmentary front elevational view of one of the indicia bearing disks used in conjunction with the present invention.

Referring now to the drawings in detail, wherein for the purpose of illustration, there is disclosed a preferred embodiment of the present invention, the numeral 10 represents the present indicator generally, of a size sufficiently small to fit into the pocket of a user and which includes a pair of inner disks 12 and 14, a pair of outer disks 16 and 18 of opaque material and a pair of transparent auxiliary disks 20 and 22 that are positioned between the disks 12 and 16, and 14 and 18 respectively to reinforce the entire device and to protect indicia on the outer faces of the inner disks 12 and 14.

All of the disks are provided with central openings that receive an internally threaded sleeve 24 having a head portion 26 that bears against the outer face of the disk 18. The sleeve 24 receivably engages a threaded pin 28 having a head portion 30 that bears against the outer face of disk 16.

Each of the inner disks 12 and 14 are divided into a plurality of areas or zones 32 which are defined by spaced radial lines 34 and 36. On the line 34, there is provided indicia 38 and 40 that indicate the minimum altitude that an instrument flight plane can be flown with air traffic control to the preceding range station on the indicator and the distance in air mileage, on the civil airway, to the preceding range station on the present computer respectively.

On the line 36 there is provided indicia 44 and 42 that indicate distance in air mileage, on the civil airway, to the next range station on the computer and the minimum altitude that an instrument flight plane can be flown with air traffic control to the next radio range station on the indicator respectively.

Each of the zones 32 are provided with indicia 46, 48, 50, 52, 54, 56, 58, 60, 62, 64, 66, 68, 70, 72, 74 and 76 that represent the radio station identification letters, the frequency of radio range station, elevation of airport in feet above sea level, standard control tower transmitting frequency, localizer frequency if airport is so equipped, chart of radio range with identifying quadrants and inbound headings on all legs, position of airport in relation to radio range station, minimum altitude that is to be flown for an initial approach over the radio range station in feet above sea level, the initial approach altitude if necessary for individual legs (the minimum altitude for the leg involved is given in feet above sea level), final approach altitude over the radio range station with the altimeter set up for the existing pressure altitude of the airport to which an instrument approach is to be made, minimum altitude to which an approach can be made with the altimeter set to existing pressure altitude of the airport to which an instrument approach is being made (day and night), compass course from radio range station to the airport, distance in miles from radio range station to the airport, type of procedure turn (L—denotes left hand, R—denotes right hand), minimum altitude of procedure turn with altimeter set to feet above sea level, and the fan marker location.

The numeral 78 represents a case having a closure flap 80 and a plurality of pockets 82 that receive the computer 10 and a plurality of auxiliary indicia bearing disks 84 that are quickly insertable between the inner and outer disks in a convenient manner.

The outer disks 16 and 18 are provided with substantially V-shaped slots or openings 86 the edges of which align with the lines defining a selected zone 32 so that the indicia in the selected zone may be conveniently visible.

It should be noted, that each of the indicia bearing disks is provided with data pertaining to substantially ten stations or stops between the initial point or take-off and the final point or destination.

The instant indicator eliminates the necessity of having to provide maps, charts, and course books and will provide a pilot with all the necessary information for safe flying between airports in a conveniently accessible and easily readable manner.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

An airway information device comprising a plurality of juxtaposed disks including a pair of inner disks and a pair of outer disks, said inner disks contacting each other, indicia bearing zones provided on the outer faces of said inner disks, said outer disks each having a radial slot for registry with a selected zone of said inner disks, means pivotally connecting all of said disks, and a pair of transparent wear plates interposed between each of said inner and outer disks and joined by said means, said inner disks and said wear plates having equal diameters, and said outer disks having diameters less than the diameters of the wear plates and the inner disks, said inner disks having indicia thereon positioned between the circumferential edges of said inner disks and the circumferential edges of said outer disks and visible through said wear plates.

CORNELIUS M. KRAMER.

REFERENCES CITED

The following references are of record in the file of this patent:

UNITED STATES PATENTS

| Number | Name | Date |
|---|---|---|
| 528,703 | Warren | Nov. 6, 1894 |
| 598,509 | Hall | Feb. 8, 1898 |
| 896,002 | Free | Aug. 11, 1908 |
| 1,323,763 | Haskell | Dec. 2, 1919 |
| 1,366,572 | Law | Jan. 25, 1921 |
| 1,412,043 | Crawford | Apr. 11, 1922 |
| 1,662,503 | Krieger | Mar. 13, 1928 |
| 2,117,155 | Dussel | May 10, 1938 |

FOREIGN PATENTS

| Number | Country | Date |
|---|---|---|
| 117,580 | Australia | Oct. 5, 1943 |
| 586,215 | Great Britain | Mar. 11, 1947 |